April 14, 1964  N. V. CASSON  3,129,000
SAW GUIDE CUTTING FLEXIBLE CONDUIT
Filed Jan. 15, 1962
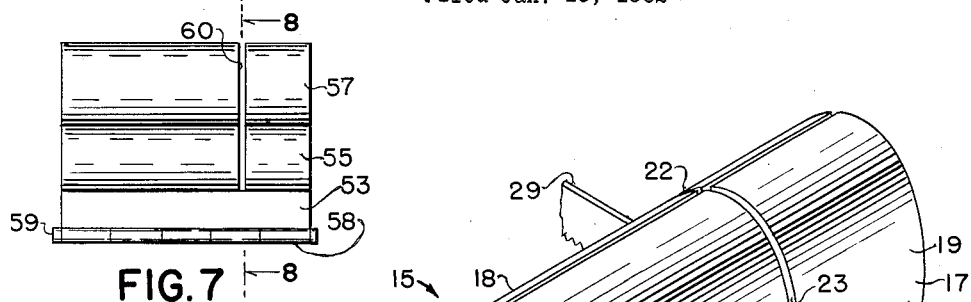
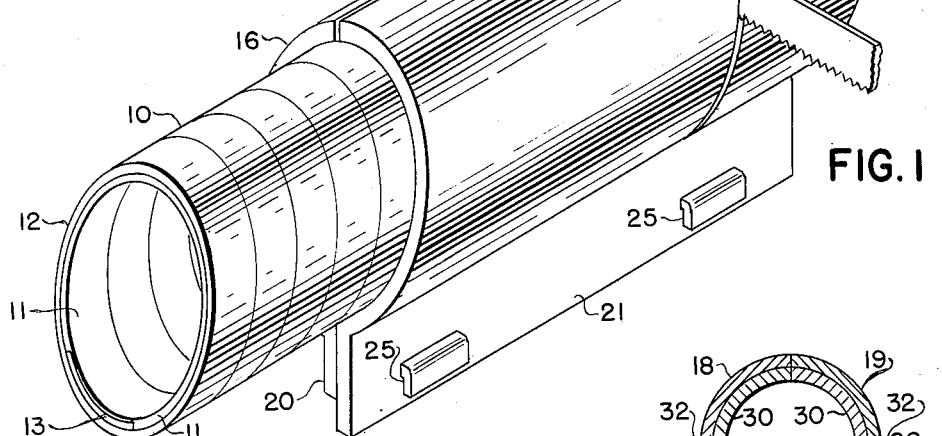
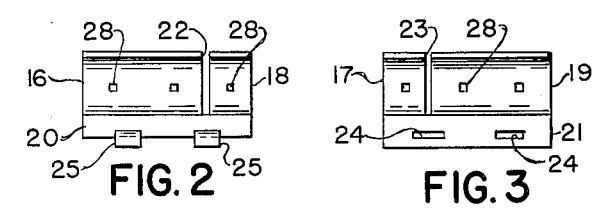
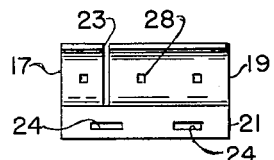
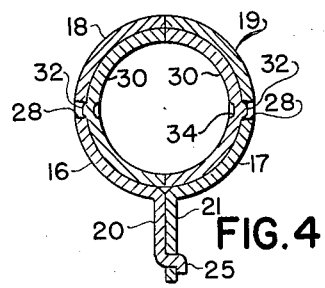
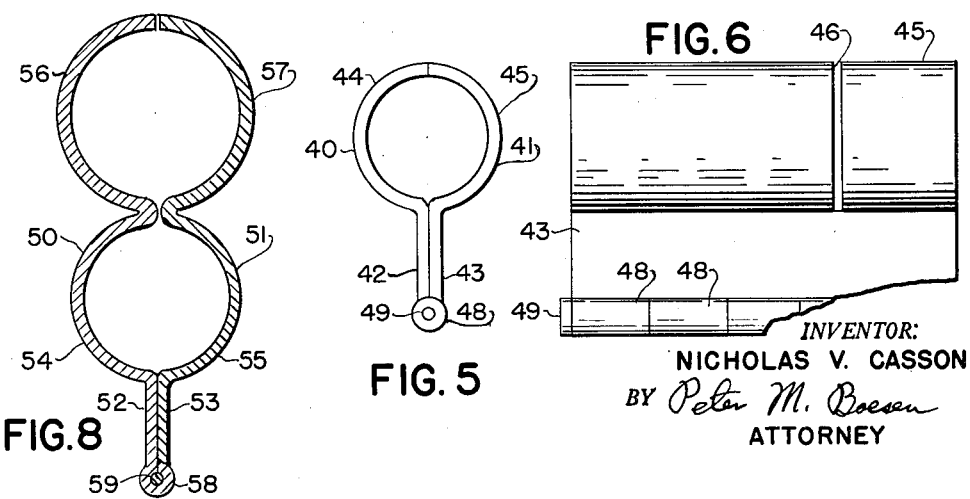
INVENTOR:
NICHOLAS V. CASSON
BY Peter M. Boesen
ATTORNEY

# United States Patent Office 3,129,000
Patented Apr. 14, 1964

3,129,000
SAW GUIDE FOR CUTTING FLEXIBLE CONDUIT
Nicholas V. Casson, 175 Murray Ave., Yonkers, N.Y.
Filed Jan. 15, 1962, Ser. No. 166,208
2 Claims. (Cl. 269—2)

This invention relates in general to saw guides and, more particularly, to a hand clamped saw guide which enables flexible conduit to be cleanly cut.

In electrically connecting motors where some flexibility is required, in certain heavy industrial installations, and in other locations flexible metallic conduit is used which is covered with rubber, neoprene, a vinyl plastic or another material to particularly resist moisture, oils, grease, acids, or other hazards. This flexible metallic conduit usually consists of an inner spirally wound ferrous metal sheath, whose convolutions are interlinked, and an outer plastic or rubber covering. In the larger sizes, a copper ground wire may be wound about the inner metal sheath.

This flexible conduit is particularly hard to cut using only a hacksaw. The convolutions of the inner metal sheath and the ground wire become unsprung and bend inward to catch the saw blade and leave ragged edges. The outer covering, then being unsupported, tears to also leave a rough edge. Despite this, it is most important that the conduit have straight and even ends in order to receive their special connectors to make a good ground and a tight fluid-proof seal.

It is, therefore, an object of this invention to provide a saw guide for cutting flexible conduit which may be clamped about the conduit and used to produce regular and even ends after cutting.

Another object of this invention is to provide a saw guide for cutting flexible conduit which may readily be applied and held in place with one hand.

A further object of this invention is to provide a saw guide for the cutting of flexible conduit which may be very inexpensively made and which may accommodate more than one size of conduit.

Still another object of this invention is to provide a saw guide for cutting flexible conduit which provides a firm grip with one hand while clamping a smaller size of conduit to be cut.

Many other objects, advantages, and features of invention reside in the construction, combination, and arrangement of parts involved in the embodiments of the invention and its practice as will be understood from the following description and accompanying drawing wherein:

FIGURE 1 is a perspective view of a first embodiment of my invention with a piece of large diameter flexible conduit clamped within it and with a fragment of a saw blade shown cutting the conduit;

FIGURES 2 and 3 are side views of the insides of the male and female sides of the first embodiment of my invention with the sides modified to receive inserts;

FIGURE 4 is a transverse section taken through the first embodiment of my invention showing inserts set in place within it;

FIGURE 5 is an end view of a second embodiment of my invention;

FIGURE 6 is a side view of a second embodiment of my invention;

FIGURE 7 is a side view of a third embodiment of my invention; and,

FIGURE 8 is a section taken on line 8—8 of FIGURE 7.

Referring to the drawings in detail, a piece of large diameter flexible conduit 10 is formed of spiral ferrous metal convolutions 11 over which there is disposed the plastic or rubber cover 12. Closely associated with the coils 11 there may be wound between their convolutions the copper ground wire 13.

As shown in FIGURES 1-4, the saw guide 15, comprising the first embodiment of this invention, consists of the two side members 16 and 17. Side member 16 has an upper semicircular channel shaped portion 18 and a base portion 20. Side member 17 also has an upper semicircular channel shaped portion 19 and a lower base portion 21. Both the channel shaped portions 18 and 19 contain saw blade width slots 22 and 23 formed near one end. The base 21 contains the two rectangular slots 24. Extending downward from the base 20 are the two offset projections 25.

As may be seen in FIGURE 1, this first embodiment of the invention is used by inserting the projections 25 through the slots 24 to pivotally hinge the base portions 20 and 21 together. The saw guide 15 is then placed about a piece of conduit 10 which is to be cut and one hand grips the channel shaped portions 18 and 19 to clamp the guide 15 in place. The slots 22 and 23 are offset from one end to afford a large and convenient hand grip. A hacksaw blade 29 or the like is manipulated by the other hand within the slots 22 and 23 to cleanly cut the clamped flexible conduit 10. This first embodiment of the invention may be cheaply and inexpensively made with a single blanking and forming operation from heavy sheet metal to make each side member 16 and 17.

Referring now to FIGURES 2-4, the first embodiment of my invention may be modified by forming guide apertures or indentations 28 in the insides or inner surfaces of the channel shaped portions 18 and 19 on either side of the slots 22 and 23. As shown in FIGURE 4, inserts 30 having raised projections 32 pressed from their outer surfaces may be placed within the channel shaped portions 18 and 19 to accommodate and grip smaller sizes of conduit. Four inserts 30 are required as pairs of the inserts 30 must be placed on each side of the slots 22 and 23. Each insert 30 may be positioned by one or more suitably placed projections 32 which engage corresponding indentations 28. With suitable inserts, all standard sizes of conduit may be held in my saw guide. If the inserts 30 themselves contain indentations 34, which may be pressed outward to form the projections 32, additional smaller inserts could be held within the inserts 30. In addition, inserts 30 of various thicknesses could be provided.

As shown in FIGURES 5 and 6, a second embodiment of this invention has two sides 40 and 41 which have the base portions 42 and 43 and the semicircular channel members 44 and 45 containing the saw guide slots 46. The base portions 42 and 43 have the knuckles 48 formed on them and they are hinged together by means of a pintle 49.

A third embodiment of this invention, as shown in FIGURES 7 and 8, has two sides 50 and 51 which have the base portions 52 and 53, the lower semicircular channel portions 54 and 55 and the upper and larger semicircular channel portions 56 and 57. The base portions 52 and 53 have knuckles 58 which are hinged about a pintle 59, but the base portions 52 and 53 could be hinged in the same manner as the first embodiment of the invention. A saw guiding slot 60 extends downward through the channel portions 54, 55, 56 and 57. When a smaller size of flexible conduit is held in the saw guide of FIGURES 7 and 8 it is clamped between the smaller first semicircular channel portions. When a larger size of flexible conduit is cut it is clamped between the larger semicircular channel portions. In both cases, however, the hand of the user grasps the saw guide about the outside of the larger semicircular channel portions. Thus the hand of the user, when cutting smaller sizes of conduit, exerts a mechanical advantage with a greater pressure enabling the smaller size conduit to be clamped more tightly. When a larger size of flexible conduit is cut it is, as stated, clamped between the larger semicircular channel portions to which it presents a larger surface area to be grasped. Thus when cutting larger diameter flexible conduit, the mechanical advantage is not needed as there is less likelihood of the larger sizes of conduit slipping within the saw guide.

In all the embodiments of this invention, the base portions must be substantial enough to transfer a clamping torque to the portion of the channels formed beyond the saw guide slots. While a saw guide can be made to accommodate each of the several sizes of conduit, the inserts in the first embodiment of the invention and the large upper portion of the third embodiment of the invention present an advantage in that their larger channel portions may be more easily grasped and hand held for cutting.

While I have shown and described my invention in the best forms known to me, it will nevertheless be understood that these are purely exemplary and that modifications in the construction, combination, and arrangement of parts may be made without departing from the spirit of the invention except as it may be more limited in the appended claims wherein I claim:

1. A saw guide for cutting flexible conduit comprising, in combination, first and second side members each having a flat base portion with upper and lower edges, a first semicircular channel portion extending upward from the upper edge of each of said base portions, and a larger semicircular channel portion extending upward from each of said first semicircular channel portions, said flat base portions and said first and second semicircular channel portions being disposed adjacent to each other, said first and second semicircular channel portions containing corresponding transverse saw guide slots disposed toward one end of said first and second side members, and hinge means pivotally joining the lower edges of said base portions.

2. The combination according to claim 1 wherein said hinge means comprises offset downward projections extending downward from the bottom edge of one of said base portions, the other of said base portions containing longitudinal slots near its lower edge, said offset downward projections extending through the slots pivotally connecting and joining said base portions.

References Cited in the file of this patent

UNITED STATES PATENTS

| | | |
|---|---|---|
| 2,085,321 | Lang | June 29, 1937 |
| 2,111,468 | Corkum | Mar. 15, 1938 |
| 2,677,479 | Kiba | May 4, 1954 |
| 2,678,574 | Brinkley | May 18, 1954 |
| 2,814,264 | Burgess | Nov. 26, 1957 |